United States Patent [19]
Schmidt

[11] Patent Number: 5,839,865
[45] Date of Patent: Nov. 24, 1998

[54] DEVICE FOR THE NONSKID TRANSPORT OF OBJECTS ON LOADING SURFACES OF MOTOR VEHICLES

[76] Inventor: Ernst Schmidt, Adolf-Lins-Strasse 1, 34628, Willingshausen, Germany

[21] Appl. No.: 631,989

[22] Filed: Apr. 15, 1996

[30] Foreign Application Priority Data

Apr. 13, 1995 [DE] Germany ........................ 295 06 079 U
Apr. 25, 1995 [DE] Germany ........................ 295 06 922 U

[51] Int. Cl.$^6$ ...................................................... B60P 7/14
[52] U.S. Cl. ........................... 410/127; 410/121; 410/129
[58] Field of Search .................................. 410/121, 127, 410/128, 129; 248/354.1, 354.6; D12/406, 414, 223; 224/403, 405, 549, 550, 925; 296/39.2, 37.5, 37.6, DIG. 1; 220/530, 551

[56] References Cited

U.S. PATENT DOCUMENTS

| | | | |
|---|---|---|---|
| 1,489,527 | 4/1924 | Henry .......................................... | 220/6 |
| 3,344,750 | 10/1967 | Kostrewa ................................. | 410/127 |
| 3,472,180 | 10/1969 | Loomis .................................... | 410/127 |
| 3,590,746 | 7/1971 | Gibson .................................... | 410/127 |
| 4,498,824 | 2/1985 | Kinkle ..................................... | 410/121 |
| 4,717,298 | 1/1988 | Bott ........................................ | 410/129 |
| 4,737,056 | 4/1988 | Hunt ....................................... | 410/151 |
| 5,167,479 | 12/1992 | Bott ........................................ | 410/121 |
| 5,526,972 | 6/1996 | Frazier et al. ...................... | 296/37.5 X |

FOREIGN PATENT DOCUMENTS

| | | |
|---|---|---|
| 1 775 104 | 10/1958 | Germany . |
| 2 243 040 | 3/1973 | Germany . |
| 40 15 556 A1 | 11/1990 | Germany . |
| 41 32 954 A1 | 4/1993 | Germany . |
| 1451117 | 9/1976 | United Kingdom . |
| 2112333 | 7/1983 | United Kingdom . |
| 2197274 | 5/1988 | United Kingdom . |

*Primary Examiner*—Stephen T. Gordon
*Attorney, Agent, or Firm*—Michael J. Striker

[57] ABSTRACT

A device for fastening on a motor vehicle with a loading surface and a boundary wall for the nonskid transport of objects, has a mounting element to be fastened on the boundary wall, a holding element, a scissor-type mechanism connecting the holding element with the mounting element, the scissor-type mechanism including a first pair of crossing levers hingedly connected with each other at a first common central point and a second pair of crossing levers hingedly connected with each other at a second common central point, each of the levers of the first pair are hinged to the mounting element, wherein the first ends of the levers of the second pair are hinged to the holding element, wherein the second ends of the levers of the first pair are hinged to the second ends of respective ones of the levers of the second pair, and wherein the arrangement is such that the scissor-type mechanism allows movement of the holding element along a path back and forth with respect to the mounting element, and fixing a unit associated with the scissor-type mechanism for fixing the holding element in any desired position along the path of the back and forth movement.

9 Claims, 3 Drawing Sheets

DEVICE FOR THE NONSKID TRANSPORT OF OBJECTS ON LOADING SURFACES OF MOTOR VEHICLES

FIELD OF THE INVENTION

The invention relates to a device for fastening on motor vehicles with loading surfaces for the nonskid transport of objects, and to a motor vehicle with a loading surface surrounded by boundary walls.

BACKGROUND OF THE INVENTION

In the course of transporting objects in a motor vehicle, which have been placed unsecured on the loading surface, the problem often occurs that, because of the lack of useful fastening possibilities, they slide back and forth in an undesirable manner during braking and acceleration maneuvers or when driving around a curve. Therefore the transport of heavy object with sharp edges can lead to damage to the superstructure or body of the motor vehicle. Numerous, mostly box- or pocket-shaped inserts have become known in connection with passenger cars (GB-A-21 12 333), which are fixed on the loading surface in the area of the trunk or on a lateral part of the body and are used to receive unsecured objects. However, the problem of sliding objects or even those flying around can only be partially solved. This applies in particular where larger and more bulky objects, such as valises, suitcases, crates of beer bottles or the like must be transported which, although they only partially fill the trunk, do not fit into such inserts. In such cases a remedy can only be found by securing the load in a cumbersome manner by means of rope, rubber bands or the like, provided there are suitable anchor points available at all.

Apart from this it is known (GB-A-14 51 117) to provide railroad wagons with parallel cheeks articulated to each other by pivotal members such that one of said cheeks or holding elements can be moved for clamping an article. For moving said one cheek a threaded rod is provided which extends transverse to the direction of movement of the cheek. Because of this the known device can not be used in a normally small and tight trunk of a passenger car.

OBJECT AND SUMMARY OF THE INVENTION

It is therefore the object of the invention to create a device suitable for mounting on a loading surface of a motor vehicle, which allows the nonskid transport of larger, bulky objects without it being necessary to provide specially constructed inserts for this.

A further object of this invention is to design the device such that it can be easily mounted particularly in a narrow space of the trunk of a passenger car.

Yet another object of this invention is to design the device such that the holding element can be easily fixed in any desired extended position.

To solve these and other objects the invention provides a device for fastening on motor vehicles with loading surfaces for the nonskid transport objects, comprising: a mounting element to be fastened on a boundary wall of the loading surface, a holding element and a device connecting the holding element with the mounting element to allow movement of the holding element back and forth in relation to the mounting element in a direction essentially extending perpendicularly in respect to the boundary wall. According to the invention the connecting device contains a scissor-grate-like device to which means are associated for fixing the holding element in a preselected position. According to a further aspect of this invention, a motor vehicle with a loading surface surrounded by boundary walls is provided, comprising: a device for the nonskid transport of objects being associated with the loading surface, said device containing a mounting element fastened on a boundary wall and a holding element which is seated on the mounting element so that it is displaceable essentially perpendicularly in respect to the boundary and can be fixed in place in a predetermined position, wherein the mounting element and the holding element are connected with each other by means of a scissors-grate-like mechanism.

Further advantageous characteristics of the invention ensue from the claims.

This invention has the particular advantage that the device can be easily adapted to objects of various sizes without essentially reducing the maximally usable loading surface, and that it can be designed in such a way that it is suitable for a multitude of motor vehicles.

The invention will be explained in detail blow by means of an exemplary embodiment in connection with the attached drawings.

DETAILED DESCRIPTION OF THE PREFERRED EMBODIMENT

Figure 1:
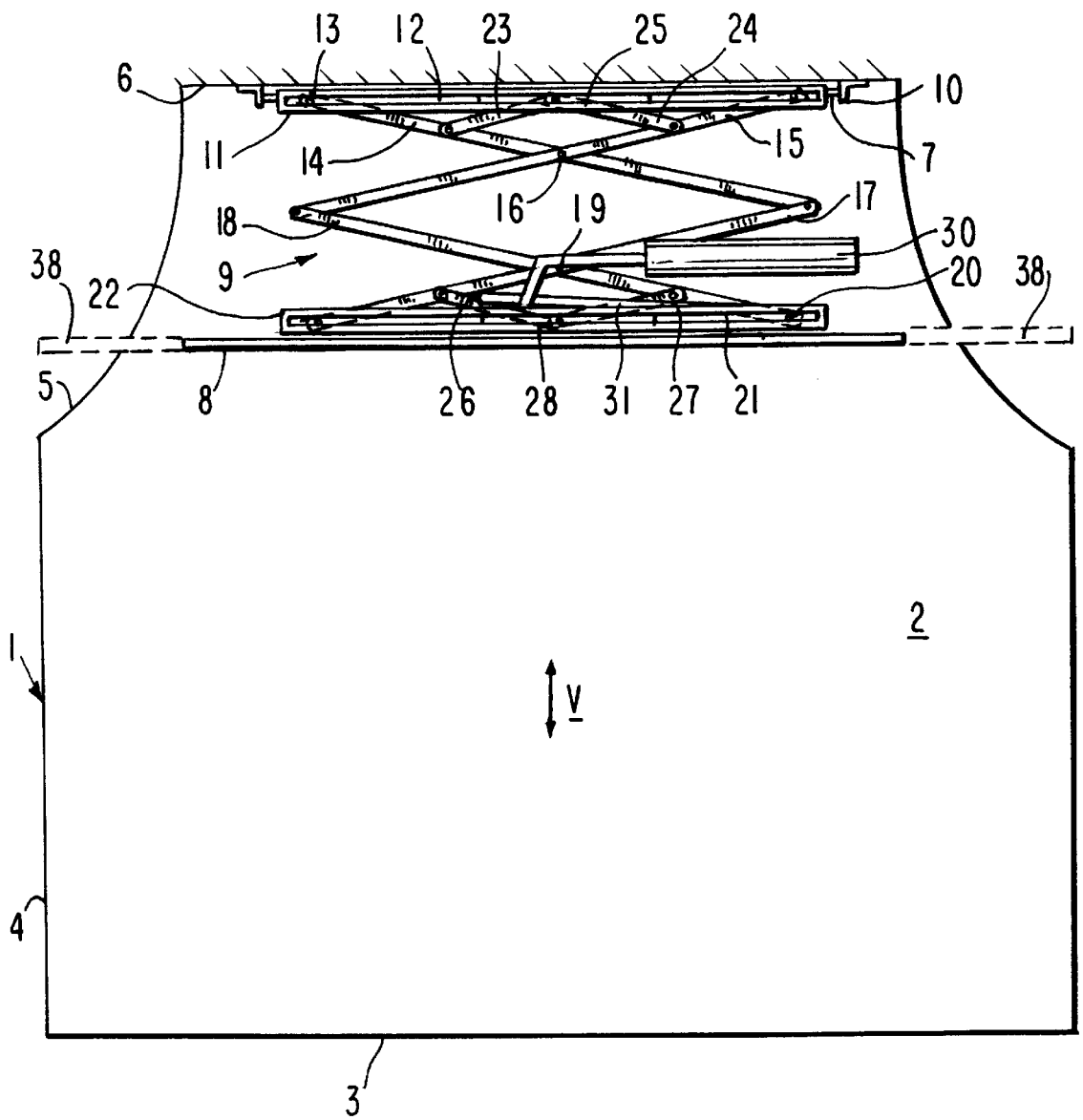
FIG. 1 is a rough schematic top view on an open loading surface of a passenger car on which the device in accordance with the invention is mouted.

FIG. 1 schematically shows the layout of a superstructure or body of a passenger car in the area of its rear trunk 1, whose floor 2 forms the loading surface. Normally a vertical rear or boundary wall 3 of more or less height with taillights, not shown, and a bumper, also not shown, are located at the rear end of the trunk 1. The sides the trunk 1 are normally bordered by lateral or boundary walls 4, which are arranged more or less obliquely and/or parallel with each other and which are often provided with concave wall elements 5 in the front area which are created by the shape of the wheel wells and which are raised and project into trunk 1. As a rule, the trunk 1 finally is bordered at its front end by an intermediate or boundary wall 6 disposed essentially perpendicular with respect to the loading surface 2, which can also be formed by the backs of seats or bench seats. In the individual case this depends on the respective type of the vehicle (sedan, coupe, station wagon or hatchback, platform body, etc.).

In accordance with the invention, a device (FIG. 1) is provided which has the purpose of adapting the size of the loading surface 2 to the requirements of individual cases and to wedge objects to be transported in a nonskid manner. For this purpose the device contains a mounting element 7 used for fastening on the motor vehicle, and a holding element 8 which consists, for example, of a plate arranged essentially perpendicularly in respect to the loading surface 2. The holding element 8 is seated, movable in the direction of a two-headed arrow, on the mounting element 7 by means of a mechanism 9. It has the purpose of changing the usable portion of the trunk 1 and at the same time to grasp and immobilize objects to be transported, so that they cannot slide while being transport by the motor vehicle.

Figure 2:
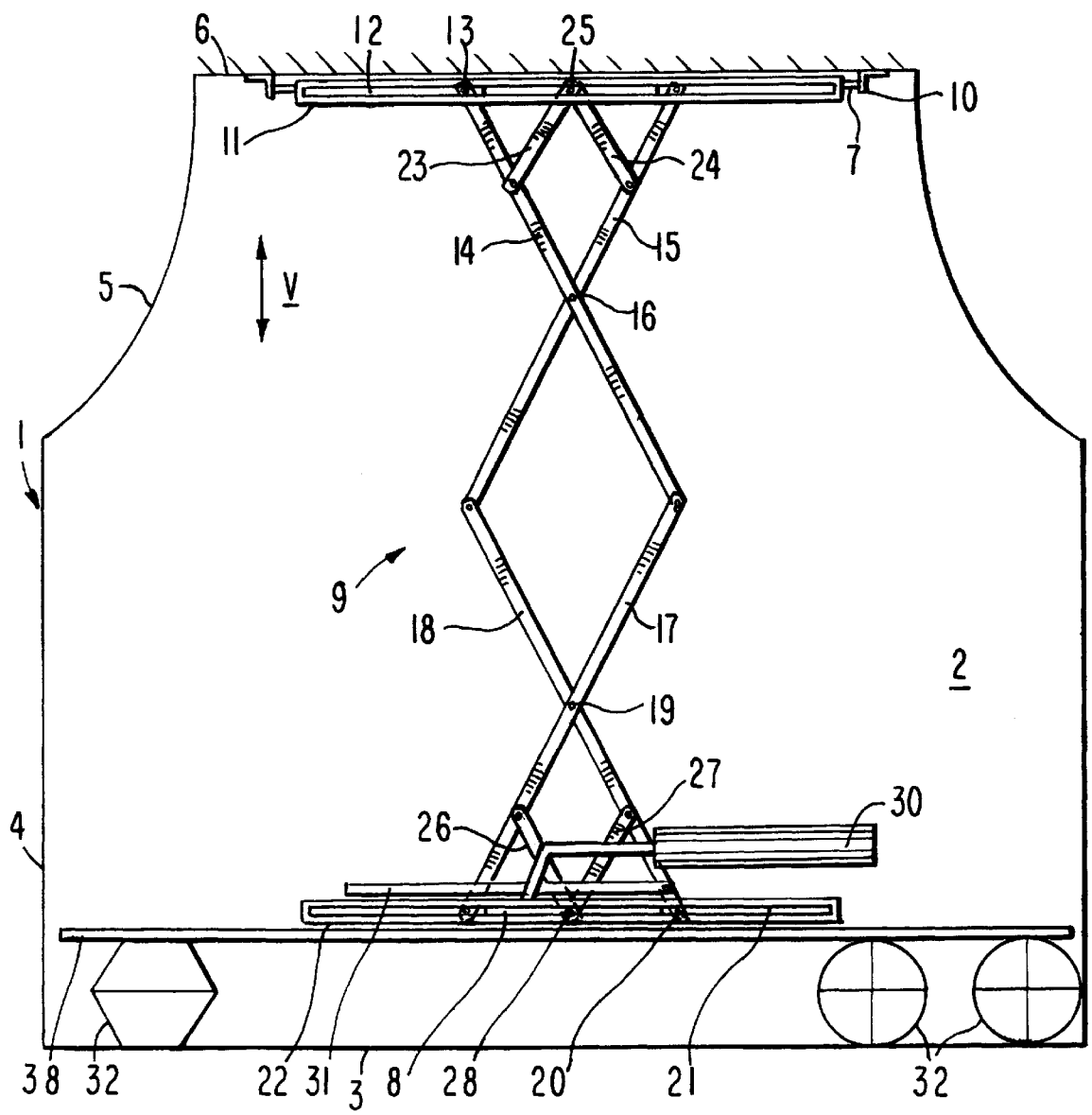
FIGS. 2 and 3 show corresponding views in connection with different transport situations.

In accordance with FIGS. 1 and 2, and an embodiment which is doomed to be the best one, the mechanism 9 consists of a scissors-grate-like mechanism. For this purpose the mounting element 7 in the exemplary embodiment is fastened, for example with screws, by means of angle pieces 10 on the boundary wall 6. The mounting element 7 essentially consists of a guide rail 11 in which elongated slots 12 are formed, extending parallel with the boundary wall 6 and parallel with the loading surface 2. Respectively one sliding piece 13 is displaceably seated in the slots 12 with a sliding fit. Respectively one lever 14, 15 is hinged on the sliding pieces 13. The levers 14, 15 cross each other at a common central hinge point 16 and are hingedly connected at their free ends with respectively one further lever 17, 18, wherein these levers 17, 18 also cross each other in a common central hinge point 19. With the aid of further sliding pieces 20 hingedly fastened on them, the free ends of theses levers 17, 18 are displaceably guided in elongated slots 21 which are formed in a guide rail 22 corresponding to the guide rail 11 and fastened on the holding element 8. Finally, portions of the levers 14 and 15 located between the hinge point 16 and the sliding pieces 13 are hingedly connected by further hinged levers 23, 24 with a fixed hinge point 25 in the center part of the guide rail 11, and corresponding levers 26, 27 are connected with the levers 17, 18 and a fixed central hinge point 28 of the guide rail 22. In the process the axes of all hinge points are preferably disposed perpendicularly with respect to the loading surface 2 and in such a way that the levers 14, 15, 17, 18, 23, 24, 26 and 27 essentially lie parallel with the loading surface 2 and form a scissors grate with two hingedly connected scissors, by means of which holding element 8 is allowed to be moved back and forth in the direction of a two-headed arrow y or essentially perpendicularly with the boundary wall 6 and between it and the opposite boundary wall 3. A manipulating lever 30, shown in an excess size and fastened on the guide rail 22 or the holding element 8, is used to ease this process. To prevent unnecessary stresses of the mounting element 7 of the device 9, the holding element 8 furthermore is preferably supported on the loading surface 2 in all positions.

The fixing in place of the holding element 8 at a preselected position suitably takes place by means of a seperate, arbitrary per se fixing mechanism 31, which is schematically indicated by a locking lever. The fixing mechanism 31 consists, for example, of a lever hinged to the lever 18 which is connected with the lever 17 by means of an elongated slot guide, wherein the connection takes place by means of a screw protruding through the elongated slot and a wing nut screwed on it which, in the tightened state, fixes the previously set position of the scissor-grip-like mechanism. Alternatively such a screw could also be provided in one of the hinge points 16, 19 or the like. Other possibilities for fixation consist, for example, in that one of the sliding pieces 13, 20 is embodied eccentrically and is fixed in the associated elongated slot 12, 21 by wedging.

In accordance with FIG. 1, the holding element 8 of the described device can be moved into a position near the front boundary wall 6, wherein the maximum loading surface 2 has been achieved or, as in FIG. 2, takes up a position near the rear boundary wall 3, which corresponds to a minimum loading surface 2. It is thus possible to wedge schematically indicated objects 32 between the boundary wall 3 and the holding element 8, because of which they are prevented from sliding during travel. At the same time it would be conceivable to utilize the space inside the scissors for further objects which are not supposed to slide.

Figure 3:
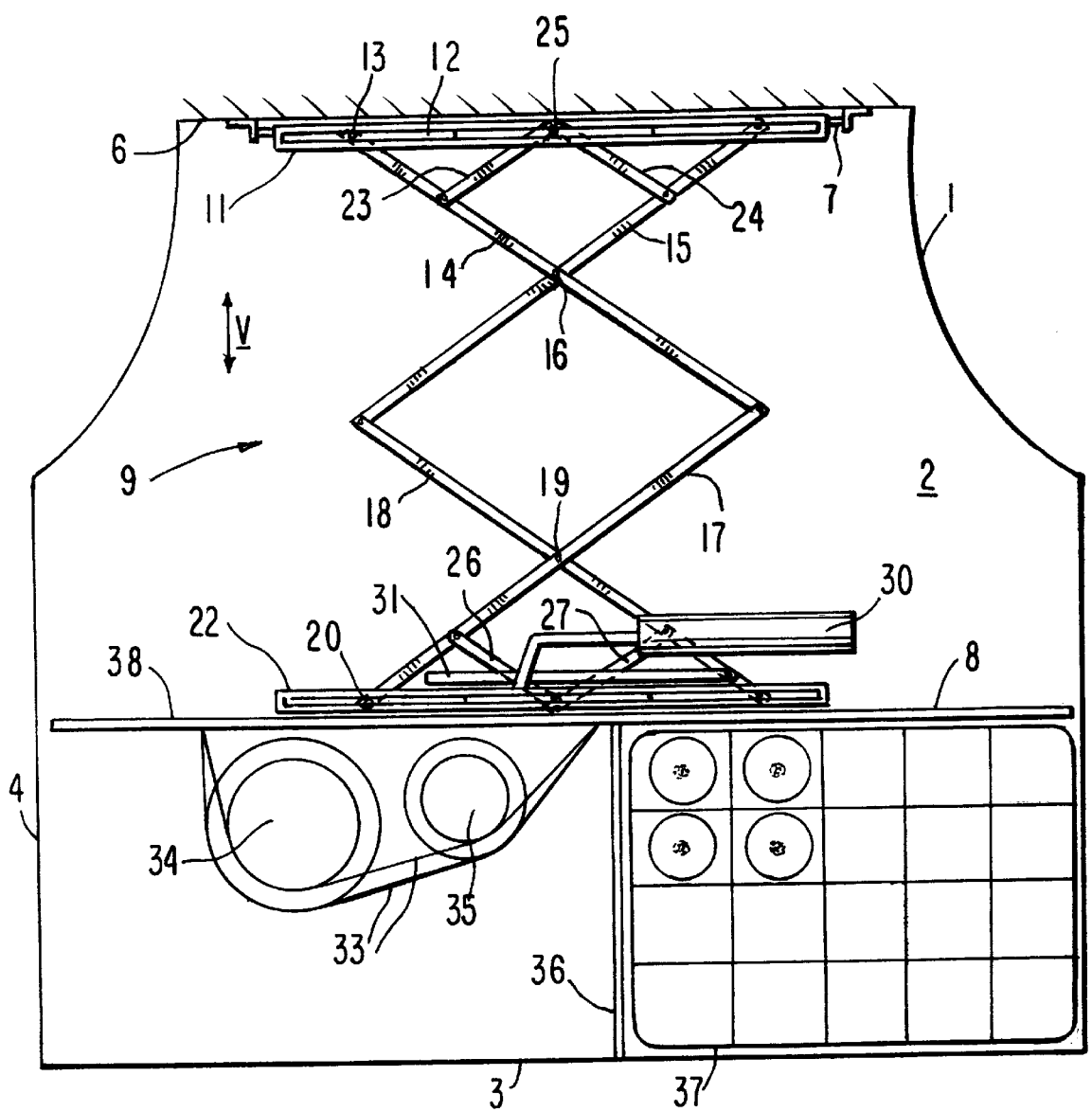

FIG. 3 shows how the device in accordance with the invention can be further designed. In this case it has been provided, on the one hand, to fasten flexible, preferably elastic straps 33 on the back of the holding element 8 for arranging further objects, for example bottles 34, 35, secure against sliding between the straps and the holding element 8. It can furthermore be provided to seat a further holding element 36 in a pivotable and, if required, fixed-in-place position on the back of the holding element 8, which can be pivoted into a position which is disposed, for example, perpendicularly in respect to the holding element 8. By means of this it would be possible, with the holding element 8 only partially pulled back, to form a space for the nonskid reception of an object 37 in the form of a crate of beer bottles or the like.

The invention is not restricted to the described exemplary embodiment, which can be changed in many ways. For example, it would be possible to provide the scissors grate mechanism with more than two scissors, or to displaceably seat the levers 14, 15, 17, 18 with the aid of sliding bushes on guide rods fastened on the mounting element 7, in which case the fixing mechanism could consist of a screw protruding through a sliding bush. In accordance with a preferred further embodiment the holding element 8 is additionally provided with laterally extendible tubes or plates 38 (FIGS. 1, 2), which can be pushed back into the holding element 8 in the area of the wall elements 5, and can be pulled out of the holding element in accordance with the distance between the boundary walls 4 in the remaining space of the trunk 1.

It is furthermore understood that the device can also be mounted in the opposite direction, i.e. the mounting element 7 fastened on the boundary wall 3 and the holding element 8 displaceable in the direction toward the boundary wall 6. Depending on an individual case, it is also conceivable to fasten the mounting element 7 on a lateral boundary wall 4 and to displace the holding element 8 transversely in respect to the direction of the two-headed arrow v. In this case the mounting element 7 and the holding element 8 can also be designed differently, depending on the type of motor vehicle, while the device 9 is preferably used unchanged in a multitude of motor vehicle types. Finally, it is also possible to provide other than the fixing mechanism shown, wherein a fixing option also consists in that a comparatively stiff scissors grate mechanism is used which provides the required fixing force by means of friction or wedging.

It will be understood that each of the elements described above, or two or more together may also find a useful application in other types of constructions differing from the types described above.

While the invention has been illustrated and described as embodied in a particular trunk of a passanger car, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitue essential characteristics of the generic or specific aspects of this invention.

What is claimed as new and desired to be protected by Letters Patent is set forth in the appended claims.

What is claimed is:

1. A device for fastening on a motor vehicle with a loading surface (2) and a boundary wall (6) for the nonskid transport of objects (32, 37), comprising a mounting element (7) to be fastened on the boundary wall (6); a holding element (8); a scissor-type mechanism (9) connecting the holding element (8) with the mounting element (7), said scissor-type mechanism (9) including a first pair of crossing levers (14, 15) hingedly connected with each other at a first common central hinge point (16) and a second pair of crossing levers (17, 18) hingedly connected with each other at a second common central point (19), each of said levers (14, 15, 17, 18) having a first and a second end, wherein the first ends of the levers (14, 15) of said first pair are hinged to said mounting element (7), wherein the first ends of the levers (17, 18) of said second pair are hinged to said holding element (8), wherein the second ends of the levers (14, 15) of said first pair are hinged to the second ends of respective ones of the levers (17, 18) of said second pair, and wherein the arrangement is such that said scissor-type mechanism (9) allows movement of the holding element (8) along a path back and forth with respect to the mounting element (7); and fixing means associated with said scissor-type mechanism (9) for fixing the holding element (8) in any desired position along said path of said back and forth movement.

2. A device in accordance with claim 1, characterized in that the holding element (8) consists of a plate.

3. A device in accordance with claim 1, characterized in that a manipulating lever (30) is associated with the holding element (8).

4. A device in accordance with claim 1, characterized in that on a side facing away from the scissor-type mechanism (9), the holding element (8) is provided with holding straps (33).

5. A device in accordance with claim 1, characterized in that said fixing means (31) comprises a fixing mechanism.

6. A device according to claim 1, characterized in that on a side facing away from the scissor-type mechanism (9) the holding element (8) has at least one further holding element (36) which is pivotably connected with the holding element (8).

7. A device according to claim 1, characterized in that said holding element (8) is provided with laterally extendable means (38).

8. A motor vehicle having a loading surface (2), boundary walls (3, 4, 6) surrounding said loading surface (2) and a device for the nonskid transport of objects (32, 37) being associated with the loading surface (2), said device comprising a mounting element fastened on one of said boundary walls; a holding element (8); a scissor-type mechanism (9) connecting the holding element (8) with the mounting element (7), said scissor-type mechanism (9) including a first pair of crossing levers (14, 15) hingedly connected with each other at a first common central hinge point (16) and a second pair of crossing levers (17, 18) hingedly connected with each other at a second common central point (19), each of said levers (14, 15, 17, 18) having a first and a second end, wherein the first ends of the levers (14, 15) of said first pair are hinged to said mounting element (7), wherein the first ends of the levers (17, 18) of said second pair are hinged to said holding element (8), wherein the second ends of the levers (14, 15) of said first pair are hinged to the second ends of respective ones of the levers (17, 18) of said second pair, and wherein the arrangement is such that said scissor-type mechanism (9) allows movement of the holding element (8) along a path back and forth with respect to the mounting element (7) and substantially perpendicularly with respect to said one of said boundary walls; and fixing means associated with said scissor-type mechanism (9) for fixing the holding element (8) in any desired position along said path of said back and forth movement.

9. A motor vehicle according to claim 8, characterized in that the holding element (8) consists of a plate disposed perpendicularly with respect to the loading surface (2).

* * * * *